United States Patent

[11] 3,608,794

[72] Inventor Harry E. Mazure
930 Westbourne Drive, Los Angeles, Calif. 90069
[21] Appl. No. 856,081
[22] Filed Sept. 8, 1969
[45] Patented Sept. 28, 1971

[54] CAMERA CRADLE
10 Claims, 4 Drawing Figs.
[52] U.S. Cl. .................................................... 224/5 V
[51] Int. Cl. .................................................... A45f 5/00
[50] Field of Search .................................... 224/5.2, 5, 26, 5.22

[56] References Cited
UNITED STATES PATENTS
2,136,357  11/1938  Darling et al. ............... 224/5
2,638,041  5/1953  Horydezak .................... 224/5
3,305,148  2/1967  Zimmerman .................. 224/5
2,651,981  9/1953  Calhoun ........................ 224/5

Primary Examiner—Gerald M. Forlenza
Assistant Examiner—Jerold M. Forsberg
Attorney—Roger A. Marrs ABSTRACT: A camera cradle is disclosed herein having a flat base including fastening means for detachably securing a camera thereto for supporting purposes. A pair of spaced diverging support members are secured to one side of the base at the opposite ends thereof so as to project upwardly adjacent the camera secured to the base. The free end of each support member carries a swivel connection for coupling to a suitable neck strap whereby the cradle-supported camera may be readily positioned transversely or tilted without encountering strap binding, interference with actuating mechanisms of the camera or unstable support for the camera.

PATENTED SEP 28 1971 3,608,794

HARRY E. MAZUR
INVENTOR.

BY Roger G. Marrs

CAMERA CRADLE

BACKGROUND OF THE INVENTION

1. Field of the Invention

This invention relates to camera supports and, more particularly, to a novel camera support adapted to be pivotally carried from a neck strap so as to permit freedom of camera positioning to a variety of view-finding orientations.

2. Description of the Prior Art

In the past, it has been the conventional practice to support handheld cameras by means of a flexible neck strap having the ends thereof secured to rings carried on the opposite ends of the camera. When the strap is placed about the operator's neck, the camera normally lies against his chest. There is a deficiency in support for the camera since the strap is connected directly to the camera case. Also, when the operator is using the camera, it is generally lifted to eye level which relieves the strap so that it is loose and sometimes interferes with the manual manipulation of the actuating or viewing mechanisms. Another disadvantage of conventional strap-mounted camera cases resides in the fact that some cameras are not evenly balanced since heavier components may be located offcenter. This latter instance will cause the camera to tilt or hang unevenly from the neck strap. It is to be noted that modern commercial or professional cameras are relatively heavy and incorporate a variety of interchangeable lens systems whereby the camera's center of gravity is frequently changed.

Therefore, a need has long existed to provide a stable platform for a handheld camera which not only supports the camera but will accommodate changes in its center of gravity.

SUMMARY OF THE INVENTION

The difficulties and problems encountered with prior art strap-supported cameras are obviated by the present invention which provides a cradle having a rectangular flat base and having a pair of spaced-apart upright support members which fixedly secure to one side of the base at its respective ends. The outwardly projecting free ends of the support members are provided with lateral swivel connectors for coupling to the opposite ends of a neck strap whereby the strap is maintained in tension as the camera is carried on the base and is moved from side to side. Means are provided on the base for detachably mounting the camera thereto and such means are offset from the opposite ends of the base to accommodate the center of gravity of the camera so that a balanced and stable condition is produced.

Additional means are incorporated into the cradle for accommodating a flash attachment bar and for snap-locking accessories to the support members.

Therefore, it is among the primary objects of the present invention to provide a novel camera cradle for establishing balanced support for a camera having an uneven distribution of weight.

Another object of the invention is to provide a cradle for a handheld camera having a neck strap pivotally connected to the cradle by lateral rotating swivels whereby the strap is placed in tension as the camera moves from side to side.

Another object of the invention is to provide a cradle support for a handheld camera having a neck strap carried thereon and means for detachably securing the camera to the cradle.

Still a further object resides in providing a novel balanced cradle for stabilizing and supporting a handheld camera which permits unobstructed operation of the camera's actuating and film storage mechanisms and which will readily accommodate attachment of camera accessories for storage purposes.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
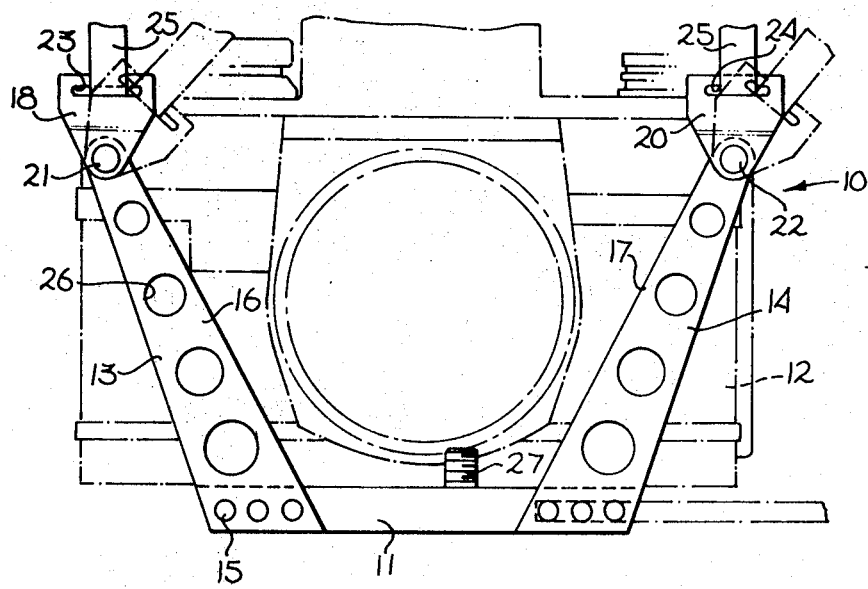
FIG. 1 is a front elevational view of the novel camera cradle incorporating the present invention.

Referring to FIG. 1, the novel camera cradle of the present invention is indicated in solid lines in the general direction of arrow 10 which includes a rectangular plate 11 constituting a rigid base for supporting a camera 12 shown in broken lines. Preferably, the plate or base 11 is composed of a rigid material, such as steel. Fixedly secured to one side of the plate 11, and on its opposite ends, there is provided a pair of support members 13 and 14 which are substantially wedge shaped in front elevational view. The support members 13 and 14 are secured to the side of the plate 11 by means of a plurality of fasteners, such as screw fastener 15. It is to be particularly noted that the support members extend or project upwardly from the plate 11 in an outwardly diverging manner so as to define a space between the opposing surfaces 16 and 17 of the support members. The space so defined will accommodate the lens portion of the camera as the case of the camera rests on plate 11 whereby the lens projects through the space between the support members so that the support members do not interfere with the field of view.

The free end of each of the support members 13 and 14 pivotally mount a swivel connector indicated by numerals 18 and 20, respectively. Pivots 21 and 22 serve to rotatably mount the swivels adjacent the extreme free end of the support members. The axis of rotation for the swivel connectors lies substantially parallel to the horizontal axis so that the pivotal movement is lateral as indicated in broken lines. Each of the swivel connectors is formed with an elongated slot 23 and 24 for accommodating a loop in the end of a neck strap 25. Therefore, it can be seen that the opposite ends of the neck strap are loosely secured to each of the swivel connectors, respectively.

Each of the support members 13 and 14 are provided with a plurality of apertures or holes, such as hole 26, which serve as lightening holes for reducing the weight of the cradle. However, it is to be understood that selected ones of the holes may be employed for holding or serving as an attachment point for releasably securing camera accessory items to the cradle for storage or temporary carrying purposes. For example, cable release mechanisms, lens holders, lens covers or the like may lend themselves to be slipped through a selected hole wherein a resilient ball may operate as a snap lock fastening means for removably securing the accessory to the cradle.

It is also to be noted that the case or body of the camera includes a threaded receptacle (not shown) for rotatably receiving a mounting screw 27. The camera may be removed from the plate 11 by rotating the screw in such a manner as to remove the screw from its mated receptacle in the body of the camera. Securement of the camera case to the cradle is achieved by rotating the securement screw so that threaded engagement takes place with the receptacle.

Figure 2:
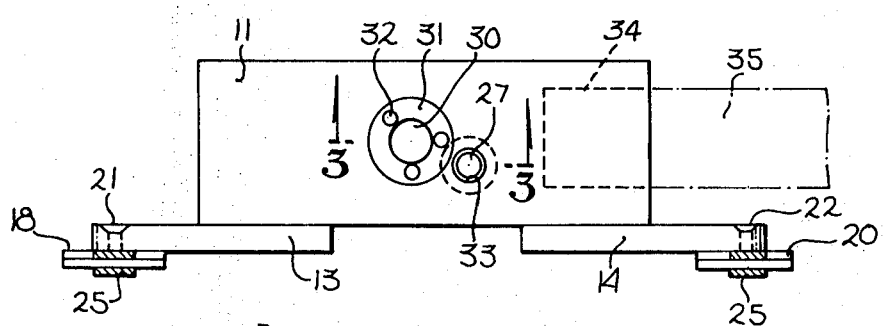
FIG. 2 is a top plan view of the camera cradle.

Referring now in detail to FIG. 2, it can be seen that the baseplate 11 includes an aperture 30 formed in an insert 31 which is press fit into the baseplate 11. Securement screw 32 may be employed to fully retain the insert in position. Aperture 30 is employed for storing the securement screw 27 when it is not in use to secure the camera body to the cradle. As shown in FIG. 2, securement fastener 27 is situated in aperture 33 adjacent to the aperture 30.

The baseplate 11 may be formed with a receptacle 34 for insertably receiving a bar 35 which may be part of a camera accessory unit, such as a flash attachment unit. By such means, the flash attachment can be secured to and held by the cradle and provision for mounting a flash attachment onto the camera body per se may be eliminated.

Figure 3:
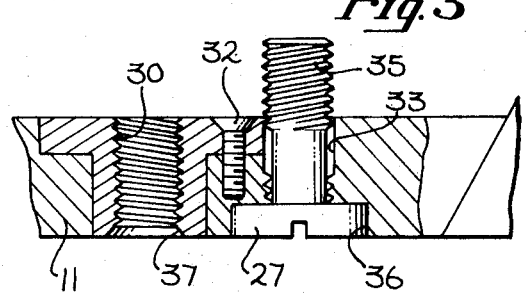
FIG. 3 is an enlarged fragmentary view, in section, of the camera-mounting means employed in the camera cradle shown in FIG. 2 as taken in the direction of arrows 3—3 thereof.

In FIG. 3, securement fastener 27 is illustrated as having a threaded shank 35 adapted to be insertably received into the camera body. The opposite end of the fastener includes an enlarged head which is received into a counterbore 36 formed on the underside of baseplate 11 so that the screw head is flush with the planar surface thereof. It is also to be noted that aperture 30 is threaded and includes a counterbore 37 so that the screw shank 35 may be inserted therein for storage purposes.

Figure 4:
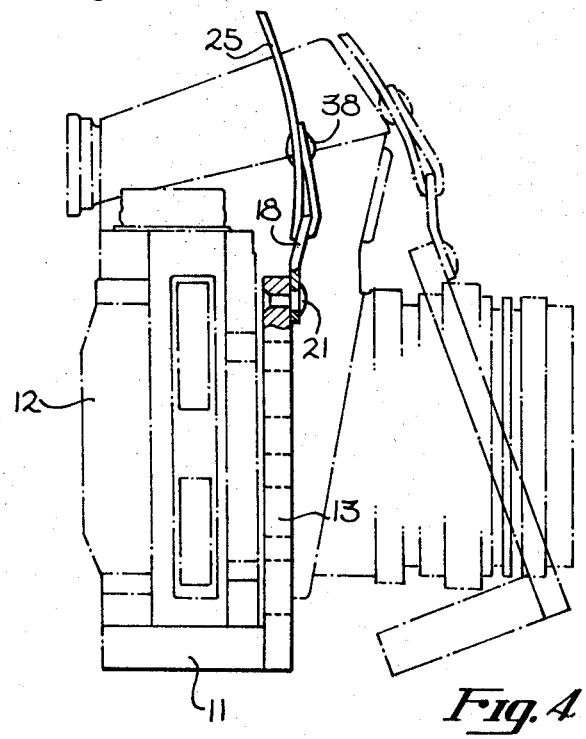
FIG. 4 is a side elevational view of the camera cradle having a portion thereof broken away to expose the strap pivotal connection therewith.

Referring now in detail to FIG. 4, it can be seen that the end of strap 25 is looped and fastened together by rivet 38 so as to be loosely secured to the swivel connector 18. As indicated in broken lines, the camera mounted on the cradle may be tilted fore and aft with respect to the front of the operator. Also, the camera, including the cradle, may be moved laterally as indicated in broken lines by the showing FIG. 1. Under such circumstances, the neck strap 25 is maintained taut and tensioned so that normal strap coils or loops created in an untensioned condition will not occur so as to obstruct operation and view-finding procedures of the camera. Also, it is to be understood that the camera may be secured to the baseplate 11 as shown in FIG. 4 or, if desired, the camera may be turned about 180° so that the back side of the camera resides adjacent the support members.

In view of the foregoing, it can be seen that the novel camera cradle of the present invention provides an advantageous means for mounting and stabilizing a handheld camera. By offsetting the location of the screw fastener 27, the camera is not in the dimensional center of the cradle. The straps may be in front of the camera as shown in FIG. 4 so that the rear of the camera is available to the hand and fingers of the operator for film-loading purposes or for actuation of the shutter button. The cradle is light in weight and may readily serve as a mounting for accommodating temporary storage of camera accessory items.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A cradle for supporting a camera comprising:
a baseplate having parallel sides and opposite ends;
a pair of spaced-apart support members fixedly secured to one side of said baseplate at said respective ends thereof;
a neck strap having its opposite ends pivotally coupled to the free ends of said pair of support members;
means releasably securing the camera to said baseplate;
laterally swingable swivel connectors movably coupling each of the free ends of said support members to the respective ends of said neck strap;
said pair of support members outwardly project in diverging manner from said baseplate whereby the opposing sides of said support members define a space therebetween for accommodating passage of camera portions; and
each of said support members is formed with a plurality of lightening holes along its major length.

2. The invention as defined in claim 1 including a receptacle formed in the center of said baseplate for storing said securement means when not in use.

3. A cradle for supporting a camera comprising:
a baseplate having parallel sides and opposite ends;
a pair of spaced-apart support members fixedly secured to one side of said baseplate at said respective ends thereof;
a neck strap having its opposite ends pivotally coupled to the free ends of said pair of support members;
means releasably securing the camera to said baseplate;
said securing means is located in a critical location offset from the dimensional center of said baseplate;
laterally pivotal connectors interconnecting said support members to said neck strap so as to permit lateral swinging of said cradle; and
a receptacle formed in the center of said baseplate for storing said securement means when not in use.

4. The invention as defined in claim 3 wherein
securing means is located in a critical location offset from the dimensional center of said baseplate.

5. The invention as defined in claim 3 wherein
said securement means comprises a hole formed in said baseplate and a threaded screw movably disposed through said hole so as to extend beyond said baseplate into threaded engagement with the camera.

6. The invention as defined in claim 3 wherein
said baseplate is formed with a receptacle opening through a selected end thereof adapted to insertably receive a bar carried on a camera accessory.

7. The invention as defined in claim 3 wherein
said baseplate and support members assume an L-shape in side elevational view and a V-shape in front elevation.

8. A cradle for supporting a camera comprising:
A baseplate having parallel elongated sides and opposite ends separated by said sides;
a pair of spaced-apart, elongated support members secured at a selected one of their ends to one of said baseplate sides adjacent said opposite ends respectively;
each of said support members being cantilevered upwardly from its securement to said plate;
a neck strap having a loop formed in the ends thereof;
a pivot connector coupling each of said strap loops to the free ends of said pair of support members;
each of said pivot connectors being pivotally movable in a parallel plane to said baseplate side to which securement of said support members is made; and
means releasably securing the camera to said baseplate whereby said support members extend immediately ahead of the camera and are separated by the optical axis of the camera.

9. The invention defined in claim 8 wherein said last-mentioned means includes a screw carried in a hole formed in said baseplate and said screw having a threaded end and a head end joined together by a smooth shank of reduced diameter; and
an annular portion of said baseplate projecting into said hole in sliding engagement with said screw reduced portion so that said screw is retained within said hole.

10. The invention as defined in claim 8 wherein
each of said support members is formed with a plurality of lightening holes along its major length.